Figure 3:
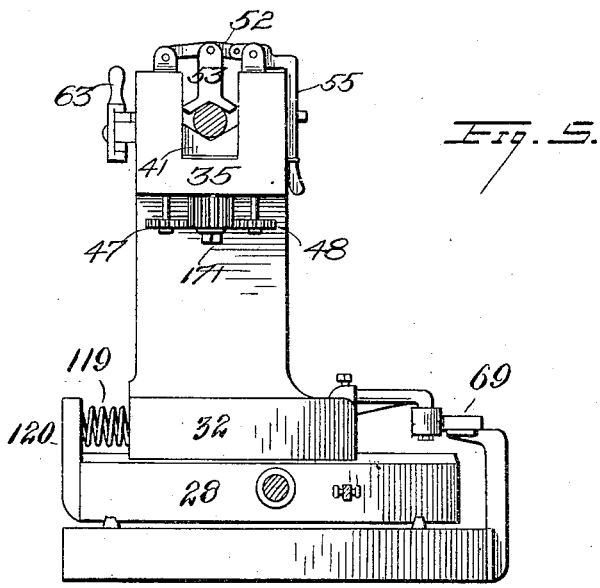

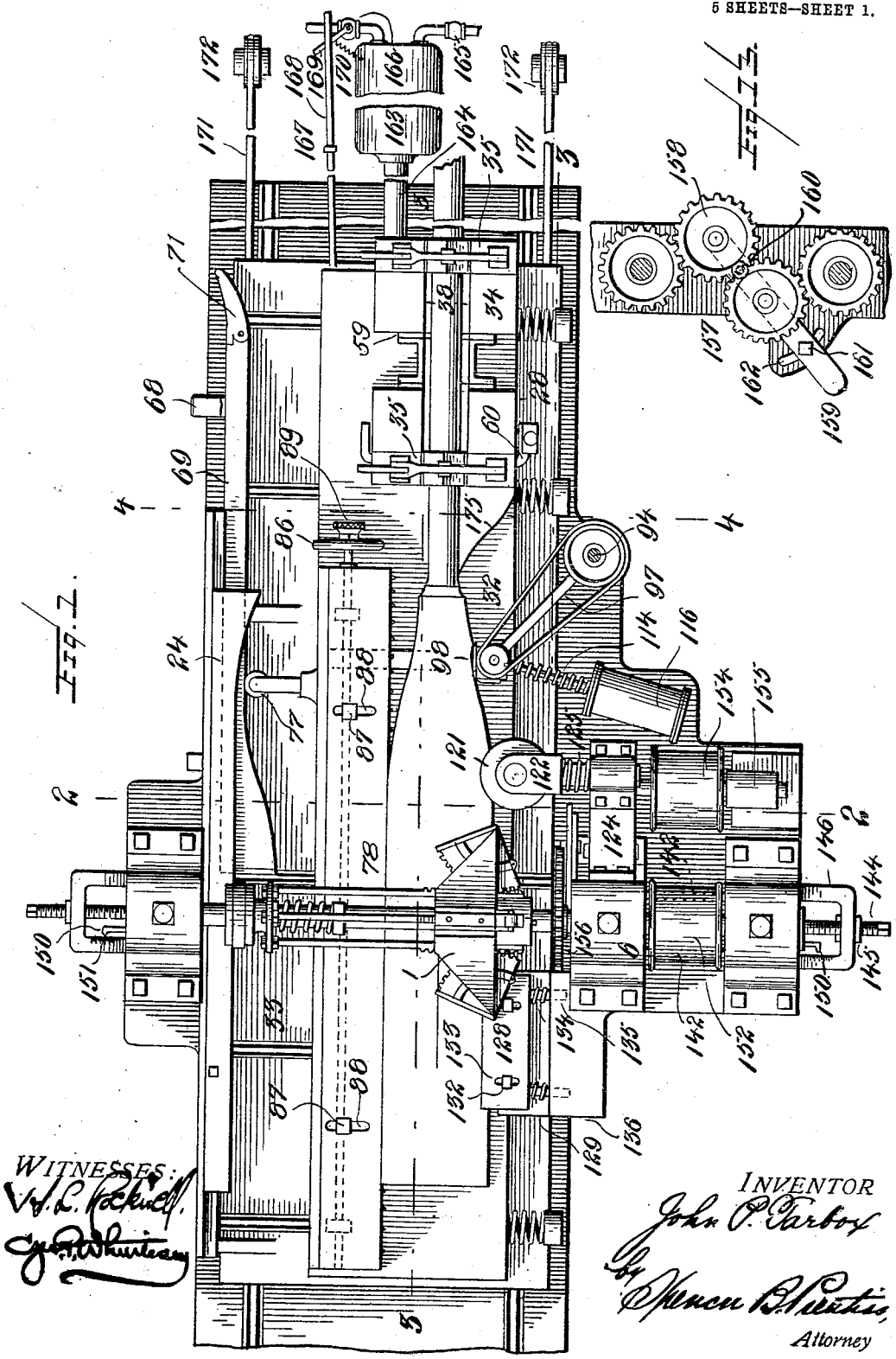

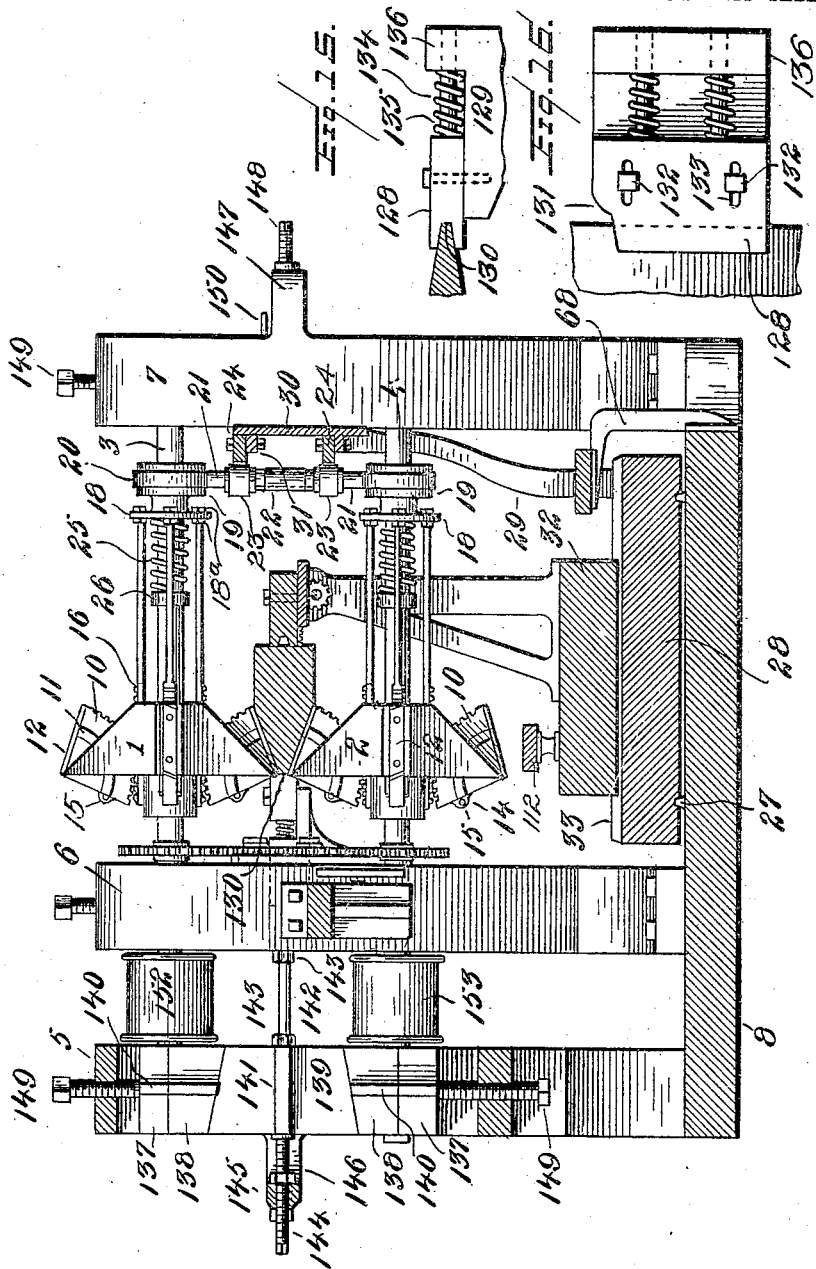

J. P. TARBOX.
MACHINE FOR SHAPING OAR BLADES.
APPLICATION FILED MAR. 29, 1907.
935,333.
Patented Sept. 28, 1909.
5 SHEETS—SHEET 3.
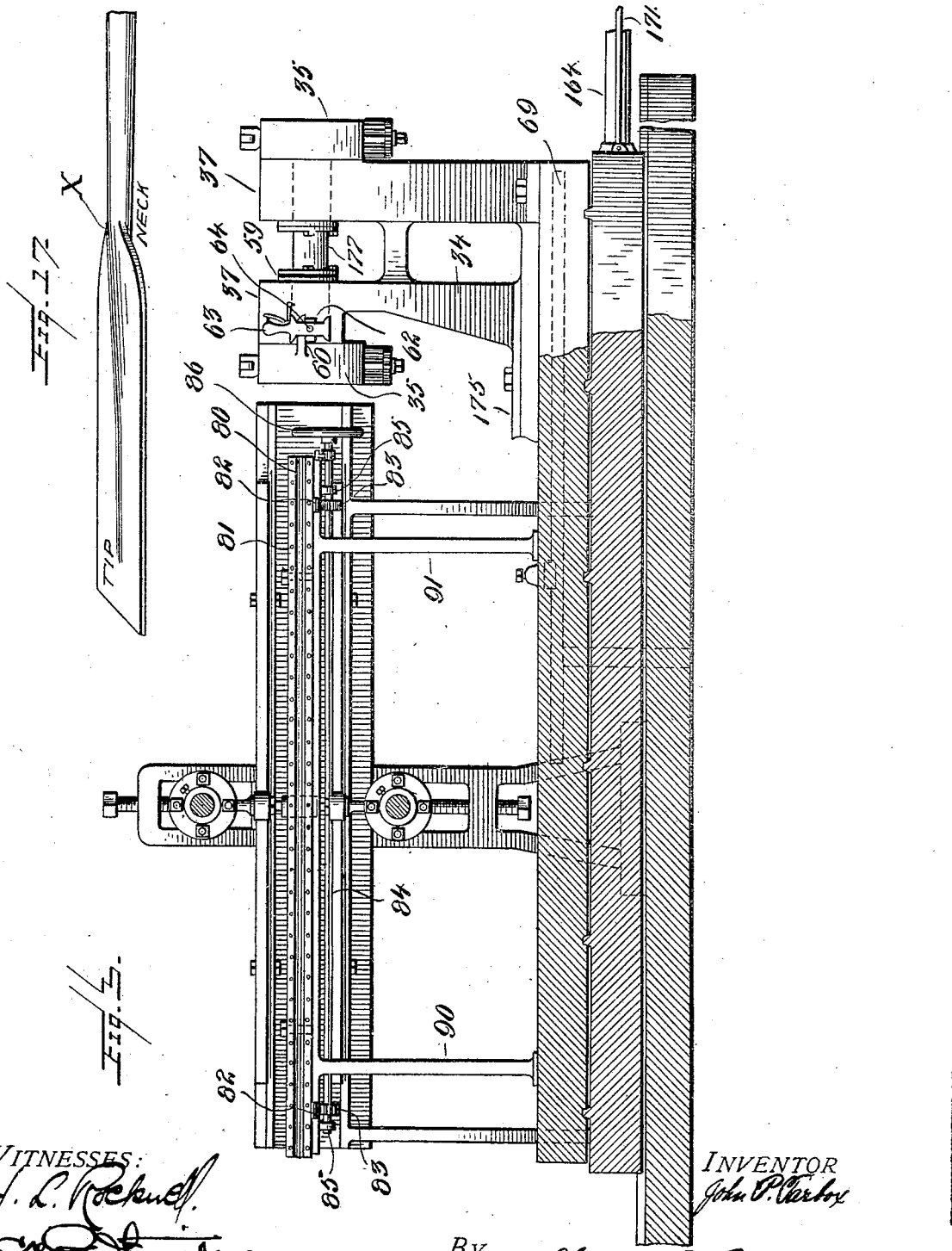

J. P. TARBOX.
MACHINE FOR SHAPING OAR BLADES.
APPLICATION FILED MAR. 29, 1907.

935,333.

Patented Sept. 28, 1909.
5 SHEETS—SHEET 4.

WITNESSES:

INVENTOR
John P. Tarbox
By Spencer B. Prentiss,
Attorney

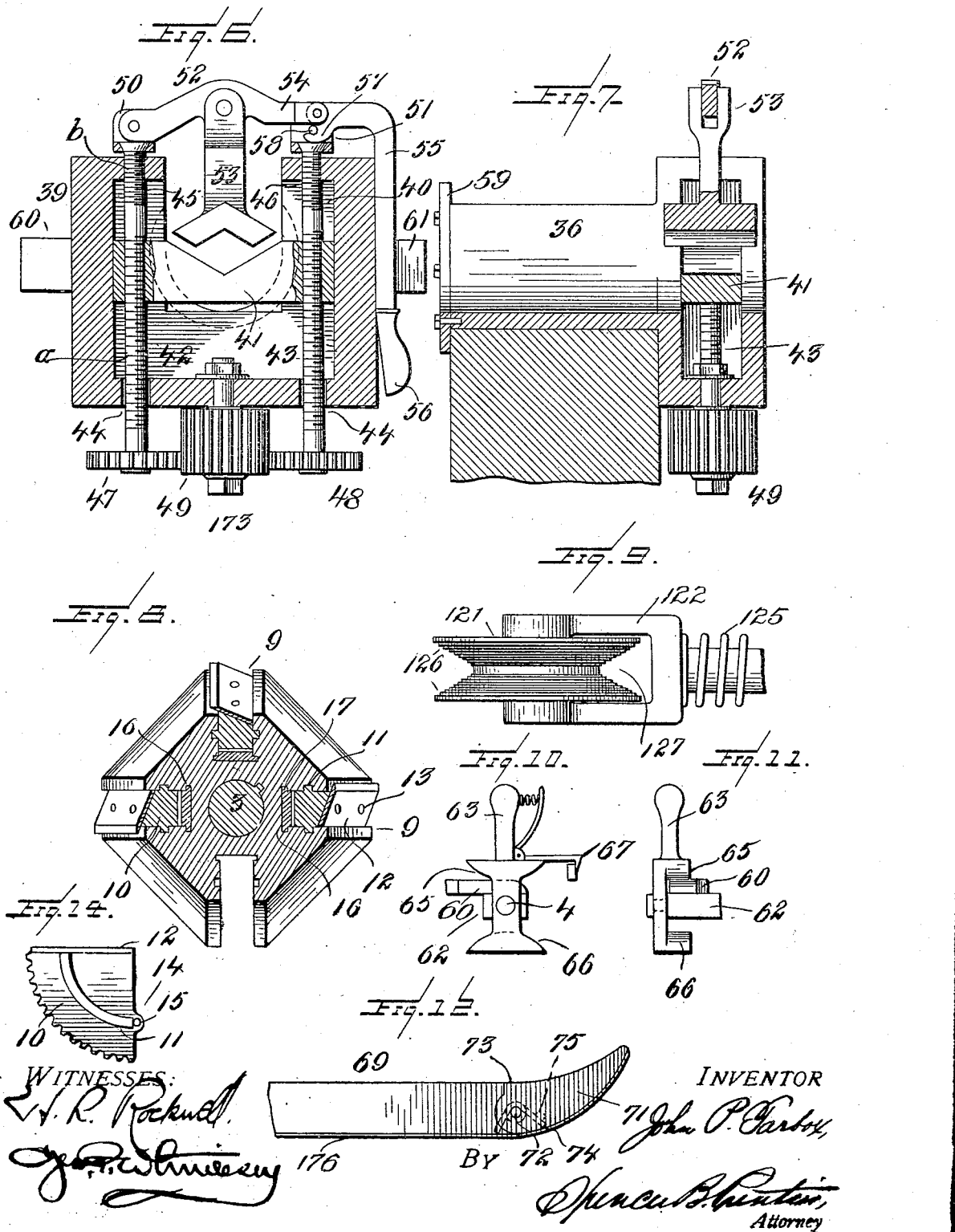

UNITED STATES PATENT OFFICE.

JOHN P. TARBOX, OF WASHINGTON, DISTRICT OF COLUMBIA.

MACHINE FOR SHAPING OAR-BLADES.

935,333.  Specification of Letters Patent.  Patented Sept. 28, 1909.

Application filed March 29, 1907. Serial No. 365,372.

*To all whom it may concern:*

Be it known that I, JOHN P. TARBOX, a citizen of the United States, residing at Washington, in the District of Columbia, have invented certain new and useful Improvements in Machines for Shaping Oar-Blades, of which the following is a specification.

My invention relates in general to machines for shaping articles of irregular form or contour, and particularly to such machines designed for forming the blades of boat oars.

While I shall illustrate my machine as having its elements formed, arranged and operating for the last named object, it will be understood that the invention is of broader scope and that, by changes obvious to the mechanic, the machine may be adapted to form other articles of irregular shape.

In forming an oar blade there are four main features to be looked after; namely, the backbone of the blade, the thickness of the edge and top, the outline or contour of the blade itself, and lastly, the symmetry of the blade with respect to the handle of the oar. The backbone is most prominent next the neck of the oar, or where the blade merges into the handle, and slopes gradually toward the tip of the blade. Between the backbone and the edges of the blade there are four plane sloping surfaces, two on each side of the blade, these surfaces merging into each other and the backbone disappearing toward the tip of the blade. These features are necessary in order to give the blade the necessary strength and requisite spring. Furthermore, the edge of the blade should be of the same thickness from the tip nearly to the neck, and the whole blade should be symmetrical with respect to the handle.

Commercial oars are usually made at present as follows: After turning the handle in a suitable lathe, the rough blank having been previously loomed out with a circular saw, all four surfaces of the blade are cut in the rough by a skilled workman, with a circular saw suited for the purpose. Each surface requires a separate operation on account of the different slopes, and long practice and much experience are required on the part of the workman before requisite skill for the operations is acquired. The oar in this shape is then passed to the finishers, who are also skilled workmen and who plane down the rough sawed blade, and shave and sand-paper the handle and blade to finish the oar. This takes up much time and makes up the greater part of the cost of the out-put.

Several machines have already been devised for making boat oars, but so far as I am aware none of them have proved practical.

One of the principal objects of my invention is to avoid excessive vibration, which is apt to occur when cutting an article of irregular shape and of such thinness as an oar blade.

Another object is to reduce the number of movements or operations necessary in the machine, thereby effecting a great saving of time.

Another object is to facilitate the change of position of the oar in the machine for the next operation.

Another object is to provide for the ready and accurate adjustment of the machine for making any one of several sizes of oars. And another object is to construct a machine which will do practically all of the work now done by hand; which will turn out a far greater number of oars per day than has heretofore been possible; and which will cut any and all sizes of oars.

My invention consists in the novel construction, and arrangement and combination of parts of the machine hereinafter described and illustrated in the accompanying drawings, in which:—

Figure 4:
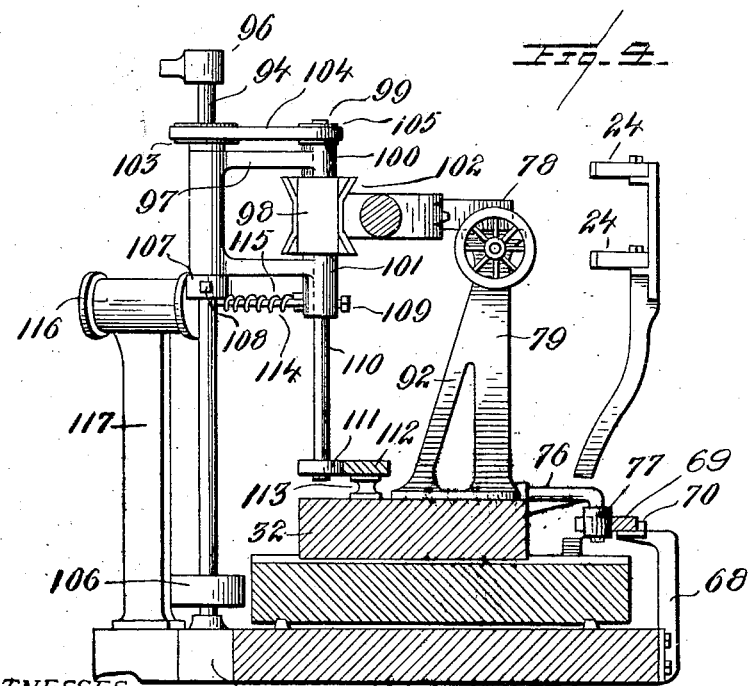

Figure 1 is a plan view; Fig. 2 is a transverse section on line 2—2 of Fig. 1; Fig. 3 is a longitudinal section partly in elevation on line 3—3 of Fig. 1; Fig. 4 is a transverse section at 4—4; Fig. 5 is an end elevation of the head stock and the carriages; Fig. 6 is a transverse section of the clamp for the work; Fig. 7 is a longitudinal section of the same; Fig. 8 is a transverse section through one of the cutter heads with one of the knives removed; Fig. 9 is a detail of the forward guide roller; Figs. 10 and 11 are detail views of the cam latch that holds the work clamps in position; Fig. 12 is a detail of the switch on the end of the transverse pattern; Fig. 13 shows the arrangement of the gearing connecting the cutter shafts; Fig. 14 is a view of one of the knife carrying segments; Figs. 15 and 16 are detail views showing the rear guide for the work; and Fig. 17 is a view of an oar blade as finished by the machine.

In my machine I cut two opposite surfaces of the oar at the same time, then turn the work through 180° and cut the remaining two surfaces. I make use of two cutters placed one directly above the other, and revolving in a fixed position. These cutters, however, I provide with movable knives which are mounted on sector blocks, the sector blocks being so journaled in the body of the cutter that they are capable of being turned about their centers, and their centers are so placed as to form the extreme periphery of the revolving cutters. The knives are so mounted on these blocks that their edges form radii of the sector. It will thus be seen that one end of the knives remains in a fixed position, and that, if I move work into the path of the cutters so that the edge of the work will pass between the centers of the sector blocks, that edge will be of constant thickness (assuming that the shafts on which the cutters revolve are at a fixed distance apart); and by moving the sectors, so that the radial knives have various slopes I have a means of making the rest of that portion of the work which comes into contact with the knives of any slope that I may desire.

Referring now to Figs. 1 and 2 of the drawing, 1 and 2 are the cutters which are keyed to the revolving shafts 3 and 4, respectively, journaled in suitable bearings in standards 5, 6 and 7, secured to the base 8 of the machine. These cutters are tetrahedral in shape being square at one end and having their sides sloped at about 45°. At each corner a slot 9 is cut wide enough to receive the sector blocks 10, which are held therein by circular flanges 11, one on each side formed concentric with the periphery of the block, and sliding in corresponding slots in the sides of the main slots 9. These blocks while capable of moving freely, are snugly fitted in the slots. Knives 12 are secured to one side of these blocks by bolts 13, the edges of the knives forming radii of the sector blocks, as previously explained; while on the other side of the block is formed a boss 14, which has a pin 15 of a length greater than the width of the slot 9, passing transversely through it. This serves to prevent the flying out of the block in case the mechanism for moving them should give way at any time. The periphery of the block is provided with teeth which mesh with the teeth of the racks 16, which slide in grooves 17, in the bottoms of the slots. The ends of these racks are attached to spiders 18, by nuts 18ᵃ, the spiders being formed integral with collars 19 which are capable of moving back and forth on the shafts. On these collars are straps 20, each strap having a rod depending therefrom 21, and the ends of the rods are slidably entered in a snugly fitting sleeve 22. This sleeve carries two rollers 23, which are adapted to roll upon patterns 24, which move longitudinally of the machine and serve to move the knives to the desired slopes as the work proceeds. Springs 25 on the shafts abutting at one end against collars 26 serve to keep the rollers against the patterns and the knives pressed to the work.

The base of the machine is provided with rails 27, on which slides a longitudinal carriage 28. Two pedestals 29 are mounted on this carriage and at such points that they will not come into engagement with the shafts 3 and 4, at either extremity of the travel of the carriage 28. A bridge piece 30 is secured to or carried by these pedestals at a height corresponding to that of the work or mid-way between the shafts and has its back side planed off so that it may slide in contact with the standard 7. This bridge-piece has two shelves 31 cast thereon to which the patterns 24 are secured by bolts.

A transverse carriage 32 is mounted to slide on rails 33 formed on the top of the longitudinal carriage 28. At one end this carriage 32 carries the head stock 34, in which are mounted suitable clamps 35 for holding the handles of the oars and centering the work in the machine. The clamps 35 are carried by the cylindrical projections 36 formed integral therewith, the projections resting in circular bearings 37 in the head-stock. These bearings are open or slotted at the top as at 38 the slots being of a width a little less than the diameter of the bearing, the cylindrical projections 36 are slotted correspondingly. This together with the hinged feature of the clamp now to be described admits of the putting in of the work from the top of the clamps and avoids all necessity of sliding it in end on, thus effecting a great saving of time. In the body 39, (see Figs. 6 and 7) of the clamps is a rectangular recess 40, the right and left portions of which are channeled to admit the free motion of the lower jaw 41 which is adapted to slide up and down therein. Two rods 42 and 43 pass through clean holes 44 in the bottom of the body and are screw-threaded into the lower jaw 41, as well as into the top of the body at 45 and 46. At their lower ends these rods are provided with gears 47, 48, which mesh with an idler 49, whose teeth are of such a length that it admits the gears 47 and 48 playing back and forth as the clutch is opened and closed. At their top ends the rods carry swivels 50 and 51. Hinged on the swivel 50 is a bar 52 carrying the depending hinged upper jaw 53, the jaw being V-shaped as in the case of the lower jaw 41. The apex of the V determining the center of the clamp as is common. The end 54 of the bar 52, has hinged thereon a latch 55 provided with a handle 56, and near the hinge with a projection 57, adapted to run under the bolt 58, which passes transversely through the two branches of the V shaped swivels 51. This serves to lock the hinged upper jaw down upon the work, once the work is put in the clamp. The clamp has a universal feature which will now be explained. The lower part $a$ of each rod which is threaded through the jaw 41 is provided with threads of pitch $2p$, say, while the upper portion $b$ of each rod which is threaded into the upper part of the body is provided with threads of pitch $p$. Thus upon a single revolution of the rods to the right, assuming that the threads are right-handed, the upper jaw 53 will be raised through distance $p$ while the lower jaw being held stationary as respects rotary motion will be pulled downward the same distance. The length of the gear 49, as previously explained, admits of the free passage of the rods 42 and 43, to the full extent of the opening and closing of the clamp.

The cylindrical projection 36 of the clamps 35 are inserted from opposite ends of the head stock and have screwed to their ends flanges 59, which serve to hold the clamps in the head-stock and at the same time admit of their being turned in their bearings. The front clamp is provided with two lugs 60 and 61, adapted to strike against the lug 62 formed on one side of the front bearing 37. These lugs are so spaced that the clamp may be turned through 180° in either direction and a cam latch 63 is mounted on the lug 62 by bolt 64 and provided with surfaces 65 and 66, adapted to clamp the lugs 60 or 61 down upon lugs 62 in either extreme position of the clamp 35. A spring catch 67 serves to hold the latch fastened once it has been set. We thus have a means of accurately determining the symmetry of the work.

On the same side of the machine as the patterns 24, arms or pedestals 68 are secured to the base of the machine. They have their upper ends L-shaped and the tops planed off and adapted to carry pattern 69. A flange or projection 70, serves to accurately position the pattern which is secured to the pedestals by bolts. The pattern 69 is provided at one end with a switch-piece 71, fitting on the end of the pattern, being secured thereto by a bolt 72, and adapted to be moved in only one direction, motion in the opposite direction being prevented by shoulder 73. Spring 74, one end of which rests on the pattern and the other end of which presses on the projection 75, serves to keep the switch in the position shown. A follower 76, provided on its end with a roller 77, is secured to the transverse carriage at a suitable point and is adapted to move the carriage and work, according to the shape of the pattern 69.

The transverse carriage carries in addition to the head-stock a steady rest 78, for the off-side of the oar blade, mounted upon pedestal frame 79. This rest has on one side a V-shaped groove 80, adapted to receive the finished edge of an oar blade, the edge of the rest, of course, being of any suitable shape to correspond with the shape of the work being done. The sides of this groove 80, are studded with pins 81, sharp-pointed, which are adapted to enter the side of the unfinished blank and give it the same support that the groove 80 gives to the finished side. On the under-side of the rest are racks 82, meshing with pinions 83, and shaft 84, journaled in bearings 85, at opposite ends of the frame 79, and provided at its end with a hand wheel 86, by which the steady-rest may be moved into or out of engagement with the work. Bolts 87, passing through slots 88, in the top of the rest, secure the rest to the frame firmly, and at the same time allow it to slide freely upon the operation of the hand-wheel 86. A jam-nut 89 with a knurled head on the end of the shaft 84, serves to clamp the rest in any desired position. The pedestals 90 and 91, of the frame 79, like those carrying the patterns 24, are so spaced that they will not come into contact with the shafts, and braces 92 and 93 are provided in order to strengthen the structure. On the side of the machine opposite this rest is a shaft 94, journaled in suitable bearings in the base of the machine, and above it either in the frame or the beam over-head, as 95 and 96. Journaled on this shaft opposite the center of the machine is an arm 97, carrying a cutter 98, mounted on a shaft 99, in bearings 100, 101, the cutter being adapted to shape the edge of the unfinished blank. The shape of this cutter is as shown, the sloped portions of the knives 102 serving to cut the edge of the work to a shape to be properly received and held by the guide-rollers as it passes between the knives. A pulley 103 mounted on the shaft 94 drives by belt 104 the shaft 99, on which the pulley 105 is mounted. Power is conveyed to the shaft through pulley 106, or other suitable manner and the collar 107, secured to the shaft by set-screw 108, serves to keep the arm elevated at the proper height. Depending from the end of the bearing 101 to which it is secured by bolt 109, is a rigid rod 110, carrying at its lower end a roller 111, adapted to follow the pattern 112, which is mounted directly beneath the work on a shelf 113 secured to the transverse carriage 32. The roller 111 is of the same diameter as the main body of the edge cutter and is pressed to the pattern by spring 114, on the piston rod 115, connecting the piston of the dash pot 116, which is mounted on the post 117, with the end of the bearing 101.

The steady rest 78 forms one means of holding the work, but as additional security against vibration I provide roller 121, held in a slide 122, which is mounted in a strong bearing 123, on the frame 124, the slide being spring-pressed upon the work by the spiral 125. The roller 121 has a V-shaped groove in its periphery, 126, the slope of this groove being the same as the slope of the edge of the work as cut by the knives on the cutter 98. Further, the sides of this groove 126 are provided with circumferential sub-grooves 127. At the rear of the cutters and as close to them as good clearance will allow, I mount a second rest 128 on a shelf 129, formed integral with the standard 6 of the machine. This rest has its edge next the work grooved to receive the finished work, as shown at 130, and the end next to the cutters is curved away from the work (131) in order to allow the work to enter properly. The sides of the grooves are also cut away thus presenting a vertical curved surface which prevents any jamming upon the entrance of the work. Bolts 132 in slots 133, serve to hold the rest permanently upon the shelf 129, while springs 134 on rods 135, screwed into the rest and sliding through the flange 136, formed on the shelf, serve to keep the rest pressed hard upon the work. The bolts 132 also serve as stops to prevent the rest being shoved too far over.

As previously stated the edge of the oar must be of constant thickness but the edges of all oars are not of the same thickness, and I provide the following means for that adjustment: The bearings of the machine are made rectangular and in two halves, 137 and 138, the half 138 having its off sides sloped to correspond to the slope of a wedge 139 placed between the two bearings. Vertical rails 140 are formed on each side of each bearing, and these rails are adapted to slide in corresponding slots in the sides of the standards 5, 6 and 7, the slots extending from the top to the bottom and the standards being of the same width as the bearing blocks. The wedges 139 are provided with horizontal rails 141, which slide in corresponding horizontal slots in the sides of the standards at a height opposite the center of the machine. The two wedges 139 in standards 5 and 6, are connected together by rods 142 provided with nuts 143 (in order to provide for adjustment). A rod 144 is screw-threaded into the wedge block in standard 5, and swiveled through a hole 145 in a yoke 146, formed integral with the standard 5. A similar arrangement composed of the blocks 139 and standard 7, yoke 147 and rod 148, comprises means of adjusting the bearings in standard 7. It is evident that as the wedges are moved in or out and the bearings set hard down by means of screws 149, a ready and rigid means of adjustment is had. Pointers 150 secured to the wedge blocks and moving over scale 151 graduated in sixteenths of an inch distance between cutters form a ready means of determining their position. As still further means of preventing vibration I arrange the pulleys 152 and 153 in combination with an idler 154, mounted in bearing 155, on the base of the machine, so that the cutters can be driven toward each other, the belt passing, for instance, under 153 from the left, under and over 152, and then under and over the idler 154, going back to the left. Going still further I provide gearing 156 between the shafts, the gearing being so meshed that corresponding knives on the upper and lower cutters, respectively, strike the work at the same instant. The arrangement of the two intermediate gears 157, 158, on an arm 159, which is revoluble about a center 160, and has means comprising a bolt 161, and a slotted arm 162, for adjusting the position of the gears—makes possible the free adjustment of the cutters without a danger of producing a jamming of the gears.

It may be noted here that the transverse carriage 32 is spring-pressed against the pattern 69, by means of spiral springs 119, which abut against lugs 120, secured to the longitudinal carriage 28.

Any suitable means, such as is common in connection with planing machines may be provided for causing the carriage to reciprocate or to move forward and automatically stop when the work has reached a certain point, but I prefer to use a dash pot 163 which has a piston attached to the longitudinal carriage by rod 164, in order to cushion the quick return of the carriage, and also in order to determine the length of travel. I may find it convenient to use water in this dash pot providing a check valve 165 opening inwardly and a valve 166, operated by stop 167 on a rod 168, which is adapted to move the arm 169, attached to the valve stem and close the valve at a predetermined point. The stop 167 is adjustable on the rod 168 and the valve 166 is held normally in the open position by means of the spring 170. I prefer also to use weights, not shown, but which may be attached to ropes 171, secured to the longitudinal carriage and passing over sheaves 172, suitably journaled near the machine.

The operation of the machine will now be described: Assuming that it is desired to blade oars of a certain size, say ten feet, the patterns for that size of oar are placed in their proper places. It may be noted here that the pattern 24 is a knife pattern and serves to determine the shape or prominence of the backbone of the oar; that the pattern 69, is of the exact shape of the edge of the oar and serves to keep the edge directly between the centers of the sector blocks; and that the pattern 112 is also of the same shape as the edge of the oar and serves to guide the edge of the cutting knife 98 in shaping the edge of the blade and preparing it for the guides. The thickness of the edge is then adjusted for that size of oar by the manipulation of the screw 144 and yoke 145, the wedges being moved until the pointer 150 indicates the proper dimension, and the bearing blocks are then set hard down by means of the screws 149. The switch piece 71 which is adapted to fit the ends of all patterns, is attached to the end of the particular pattern 69, and the stop 167 on the rod 168 is adjusted so that the longitudinal carriage is stopped at the proper point upon its return motion. This done, the hinged tops 52 of the clamps 35 are thrown back and an oar blank placed therein and the clamps closed by means of the latch 55. By turning the pinion 173 with a wrench the jaws are tightened down on the handle of the oar, thus adjusting the clamps once for all for that size of oar, the latches 55 firmly clamping the work upon its insertion thereafter. The steady rest 78 is then shoved into the side of the blank to be shaped by turning the hand wheel 86, the pins 81 entering the wood and the rest being clamped in that position by the thumb screw 89. The machine having been previously started and the cutters revolving, the carriage is started forward. The blank first strikes the edging knife which trims the edge of the blade as it proceeds, and striking the roller 121 close up to the cutters, is guided into them, the rest 128 coming into play to steady the work as it is finished. During this forward movement the pattern 24 operates to shape the backbone of the blade, the pattern 112 determines the contour of the edge of the blade as cut by the edging knife 98, while the pattern 69 so moves the transverse carriage as to keep the edge thus cut at the proper point between the cutters and so cut the edge of a uniform thickness. The one side of the blade being thus cut, the carriage is stopped, and the power is thrown off in any suitable manner. At the same instant the roller 77 on the transverse carriage slips around the end of the pattern 69 and back of it, and the weights pull the carriage back, the work being out of reach of the cutters. Reaching the switch-piece 71, the roller 77 trips it, and passing it, assumes a position in front of it as it flies back; the stop 167 closes the valve 166, and the carriage is stopped ready for a second operation. The one side of the blade being thus cut, the blank is then turned through 180°, the lug on the opposite side of clamp 35 coming up under the lug 62. The latch being jammed home on top of it, the carriage is started forward to complete the remaining side of the oar in like manner, the steady rest having been of course adjusted to the finished side of the blank, the V-shaped groove coming into play to hold the thin edge of the oar. The machine thus set up requires no further adjustment until it is desired to change the size of the oars being cut. Thenceforward it is only necessary to manipulate the clamps and the steady-rest as the work is put in, and taken out.

It is evident that as the backbone is cut by pattern, any desired weight of oar may be made, the spring of the blade being regulated at will by the prominence of the backbone. It may be very thin and flat near the tip of the oar producing an oar of extreme lightness and springiness, or, by a suitable change of pattern, may be made heavy and strong. It will also be noted that the edge of the blade may be made of any desired thickness, that the work is accurately centered upon the handle previously turned, and that the shape of the edge or general contour of the blade is determined by a centered pattern—all tending to produce an oar of perfect symmetry. It is also evident that I have produced a machine that is thoroughly flexible, being adapted to cut any and all sizes, shapes, and weights of oar. Vibration in the machine is reduced to a minimum, thus enabling a finished product to be turned out. At this point the four surfaces making up the two sides of the blade necessarily run tangent to the neck in order to avoid weakening the oar at this point. The ridges X may be easily removed with a few strokes of a spokeshave, thus finally producing a well rounded oar of perfect form and finish.

It may be noted here that a cam surface 175 formed integral with the transverse carriage, and of the same height as the shelf 113 which it adjoins, serves to move the edge cutting knife out of the path of the approaching clamp 35 upon the forward movement of the machine carriages, while the dash-pot 116 prevents the immediate return of the cutter 98 or its slamming upon the return motion of the carriage. It may also be noted that I contemplate facing all patterns with sheet metal, as shown at 176 (see Fig. 12) in order to prevent the wear on the wooden patterns, which are used on account of the ease with which new patterns may be made. The two clamps 35 in the headstock 34 are rigidly connected together by a flanged piece 177, this piece or connection being correspondingly slotted in the top, thus doing away with the necessity for a second cam latch 63 at the second clamp.

In accordance with the patent statutes, I have described the operation of my invention as embodied in a machine for forming the blades of oars, but it is evident that the parts may be much modified, and the machine put to other uses without departing from the spirit of my invention. The appended claims are intended to cover all such modifications.

What I claim as new, and desire to secure by Letters Patent is:—

1. In a machine of the character described, the combination with a longitudinally reciprocable carriage, of a transversely movable carriage thereon, work clamping means upon said transversely movable carriage, coöperating cutters for operating on opposite sides of the work simultaneously, the cutting thrust of one of said cutters opposing that of the other, and patterns for moving said transversely movable carriage parallel to the axis of said cutters and for controlling said cutters during the movement of said reciprocable carriage.

2. In a machine of the character described, the combination of a longitudinally reciprocable carriage, of a transversely movable carriage thereon, a headstock and a steady-rest for the work upon said transversely movable carriage, work guiding means upon a fixed part of the machine coöperating with said steady-rest, coöperating cutters for operating upon opposite sides of the work simultaneously, patterns moving said transverse carriage, and patterns for controlling said cutters during the movement of the reciprocable carriage.

3. In a machine of the character described, the combination with a longitudinally reciprocable carriage, of a transversely movable carriage thereon, work clamping means upon said transversely movable carriage, coöperating cutter heads mounted upon opposite sides of the path of movement of the work, cutter knives controllably mounted in said cutter heads so as to make simultaneously diametrically opposite cuts upon opposite sides of the work, and patterns for moving said transversely movable carriage and for controlling said cutters during the movement of the reciprocable carriage.

4. In a machine of the character described, the combination with a longitudinal reciprocable carriage, of a transversely movable carriage thereon, work clamping means upon said transversely movable carriage, coöperating cutter-heads driven in opposite directions mounted upon opposite sides of the path of movement of the work, cutter knives controllably mounted in said heads so as to make simultaneously diametrically opposite cuts upon opposite sides of the work, and patterns for moving said transverse carriage and for controlling the movement of said cutters during the movement of the longitudinal carriage.

5. In a machine of the character described, the combination with a longitudinally reciprocable carriage, of a transversely movable carriage thereon, a headstock upon said transversely movable carriage, a steady-rest also on said transversely movable carriage extending in a line parallel with the work, work guiding means upon a fixed part of the machine coöperating with said steady rest, means for adjusting said steady-rest with respect to the work, cutters to engage and operate upon the work, and means for controlling the movement of the transversely movable carriage and varying the cut of said cutters during the movement of the reciprocable carriage.

6. In a machine of the character described, the combination with a reciprocable carriage, of a headstock carried thereby, coöperating rotary cutters operating upon opposite sides of the work simultaneously, the cutting thrust of one of said cutters opposing that of the other, and means operative during the forward movement of said carriage to change the effective angle of cut of said cutters simultaneously.

7. In a machine of the character described, the combination with a reciprocable carriage, of a headstock carried thereby, coöperating cutter heads suitably journaled upon a fixed part of the machine, cutter knives correspondingly mounted in said cutter heads, a gearing connection between said cutter heads arranged to maintain each knife in a cutter head in coöperative relation to a corresponding knife on the other cutter head so as to cut simultaneously upon opposite sides of the work, the cutting thrust of the knives upon one cutter head opposing that of the knives upon the other, and means controlled during the reciprocation of said carriage to adjust the cutting angle of said knives.

8. In a machine of the character described, the combination with a reciprocable carriage, and work clamping means carried thereby, coöperating cutter-heads suitably journaled upon a fixed part of the machine, cutter knives movably mounted on said cutter heads, so as to move about a point lying in the knife edge as a center, and means controlled in a predetermined manner during the reciprocation of said carriage to adjust the angle of said knives whereby an edge of uniform thickness is formed upon the work.

9. In a machine of the character described, the combination of a reciprocating work-carrying carriage, of a main cutter for operating upon the work, work holding means for holding the work during the aforesaid operation, and a shaping cutter having an irregular cutting edge which engages the work in advance of said holding means and said main cutters, and which prepares the work for reception by said holding means and is pattern controlled to cut a part of the work to its finished contour.

10. In a machine of the character described, the combination of a reciprocating work-carrying carriage, of a main cutter for operating upon the work, work holding means for holding the work during the aforesaid operation, said work holding means being independent of the carriage and engaging the surface shaped by the preliminary cutter, and a bodily movable preliminary shaping cutter which engages the work in advance of said holding means and main cutter, and means for bodily moving said preliminary cutter.

11. In a machine of the character described, a cutter head provided with slots, blocks pivotally mounted in said slots, a curved tongue and groove connection between each block and the head, knives mounted on the blocks, and means for controlling the position of the knives.

12. In a machine of the character described, a cutter head, transverse slots in the cutter head, segments mounted in said slots, a curved tongue and groove connection between each segment and the cutter head having the center of the segment as the center of curvature, a cutter knife mounted upon said segment, and rack and pinion mechanism to control the position of said segment.

13. In a machine of the character described, a cutter head provided with transverse slots, a segment mounted in each of said slots, a cutter mounted upon an edge of said segment, a curved tongue and groove connection between each face of said segment and the cutter head having a point upon the knife edge as the center of curvature, pinion teeth upon the periphery of said segment, a rack reciprocable in the slot of said cutter head and engaging said pinion teeth, and a sliding collar coöperating with the rack to control the position of the segments.

14. In a machine of the character described, a cutter head provided with transverse slots, a segment mounted in each of said slots, a cutter knife mounted upon an edge of said segment, a curved tongue and groove connection between each face of said segment and the cutter head, having a point upon the knife edge as the center of curvature, pinion teeth upon the periphery of said segment, rack bars engaging said pinion teeth, a sliding collar to which said rack bars are connected, and a spring mounted to thrust said collar positively in one direction.

15. In a machine of the character described, coöperating cutter-heads revolubly journaled and each provided with transverse slots, a segment mounted in each of said slots, a cutter knife mounted upon an edge of said segment, a curved tongue and groove connection between each face of said segment and the cutter head having a point upon the knife edge as the center of curvature, pinion teeth upon the periphery of said segment, rack bars engaging said pinion teeth, a sliding collar to which said rack bars are connected, a spring mounted to thrust each collar positively in one direction, and patterns to control the movement of said collars in the opposite direction against the tension of said springs.

16. In a machine of the character described the combination of a reciprocable carriage and work clamping means carried thereby, coöperating cutters journaled upon a fixed portion of the machine for operating upon both sides of the work simultaneously, pattern controlled means for adjusting the angle of said cutter blades about an end of the edge thereof as a center whereby an edge of uniform thickness is produced upon the work, and means for adjusting the relative distance of said cutters from each other to produce an edge of different thickness.

17. In a machine of the character described, a base, bearing standards uprising from said base, bearing blocks slidably mounted one above the other in each standard, cutter shafts journaled in said bearing blocks one above the other and carrying cutters, and a wedge block movable longitudinally of said cutter shafts between the bearing blocks of each standard to vary the distance between the cutters.

18. In a machine of the character described, a base, bearing standards uprising from said base, bearing blocks slidably mounted one above the other in each standard, cutter shafts journaled in said bearing blocks one above the other and carrying cutters, a wedge block between the bearing blocks of each standard to move the bearing blocks equally in opposite directions to adjust the distance of the cutters apart, and a screw controlled rod for centering and moving said wedge block.

19. In a machine of the character described, a base, bearing standards uprising from said base, bearing blocks slidingly mounted one above the other in each standard, cutter shafts journaled in said bearing blocks one above the other and carrying cutters, a wedge block between the bearing blocks of each standard to move said bearing blocks equally in opposite directions to adjust the distance of the cutters apart, a screw controlled rod for centering and moving said wedge block, an indicator controlled by the movement of the wedge block adjusting means which indicates the cutter adjustment.

20. In a machine for shaping oar blades, the combination with a reciprocable carriage, of a transversely movable carriage, a head-stock on said transverse carriage provided with clamping means for the oar handle, coöperating cutters for operating upon opposite sides of the blade simultaneously, a pattern to govern the movement of said transverse carriage, and a pattern to control the angle of said blades.

21. In a machine for shaping oar blades, the combination with a longitudinally reciprocable carriage, of a transversely movable carriage thereon, means for clamping an oar blank upon said transversely movable carriage, coöperating cutters for operating upon opposite sides of the blade portion of the oar simultaneously, a pattern to control the angle of said cutters, and a pattern to move said transversely movable carriage transversely as the handle portion of the oar approaches said cutters.

22. In a machine for shaping oar blades, the combination of a longitudinally reciprocable carriage, of a transversely movable carriage thereon, clamping means for an oar blank upon said transversely movable carriage, coöperating cutters for operating upon opposite sides of the blade portion of the oar simultaneously, an auxiliary cutter for trimming the edge of the oar blade, a pattern for controlling the angle of cut of said coöperating cutters, a pattern for controlling the transverse movement of said transversely movable carriage, and a pattern for controlling and throwing out of engagement said auxiliary cutter.

23. In a machine for shaping oar-blades, the combination with a longitudinally reciprocable carriage, of a transversely movable carriage thereon, a headstock and clamping means coöperating therewith for clamping the oar handle, a steady rest upon said transversely movable carriage for engagement with one edge of said oar blade, and formed to grip the thick edge of the blade blank and also the thin edge of the blade when finished, guiding means mounted upon a fixed portion of the machine to engage the other edge of the blade, coöperating cutters for operating upon opposite sides of one half of the blade simultaneously, means for moving said steady rest to a disengaged position, and means for inverting the position of the clamps carrying the oar to bring the unfinished half of the blank between the cutters.

24. In a machine for shaping oar blades, the combination with a longitudinally reciprocable carriage, of coöperating cutters for operating upon opposite sides of the blade portion of the oar simultaneously, a headstock carried by said carriage and provided with a longitudinal bore, and a self-centering invertible clamp for an oar handle having a cylindrical projection journaled in said bore.

25. In a machine for shaping oar blades the combination with a longitudinally reciprocable carriage, of coöperating cutters for operating upon opposite sides of the blade portion of the oar simultaneously, a headstock carried by said carriage and provided with a longitudinal bore and a slot communicating therewith, a self-centering clamp for an oar handle having a cylindrical projection seated within said bore and provided with a slot registering with said first mentioned slot.

26. In a machine for shaping the blades of oars, the combination with a longitudinally reciprocable carriage, of coöperating cutters for operating upon opposite sides of the blade portion of the oar simultaneously, a headstock carried by said carriage having two bearing portions longitudinally bored and in line with each other, two self-centering clamps carried by said headstock, one in each of said bearing portions, and a rigid flanged connection between them.

27. In a machine of the character described, a reciprocating carriage, cutters having pattern controlled knives arranged to engage opposite sides of the work, cutters for engaging the edges of the work also guided by pattern, means on the carriage for moving said edge cutters away from the work at the completion of their cut, and means for preventing too rapid a return of said edge cutters during the return movement of said reciprocating carriage.

28. In a machine for blading oars, a base, a reciprocating carriage mounted thereon, a transversely movable carriage mounted on said reciprocating carriage and carrying the work, cutters for operating upon the opposite faces of the work, a cutter for operating upon the edge of the work at the same time, means operated by the motion of said reciprocating carriage in one direction for moving the said edge cutter out of engagement with the work, and means for preventing too rapid a return of said edge cutter to the work upon the return movement of said reciprocating carriage.

29. In a machine of the character described having a base and a reciprocating carriage mounted thereon, a pair of adjustable cutter shafts carrying coöperating knives, sliding collars also mounted on the shafts, a connection between the knives on each shaft and the corresponding collar, and an expansible connection between the collars on the two shafts.

30. In a machine for forming the blades of oars, a base and a reciprocating carriage mounted thereon, a pair of oppositely revolving cutter shafts adjustable toward and from each other carrying pattern controlled knives, a spur gear on each shaft, two intermeshing gears meshing with the aforesaid gears, said last named gears being journaled on an arm pivoted at a point midway between the two revolving shafts, and means for setting said arm in any position.

31. In a machine of the character described, a base, a reciprocating carriage, a pair of oppositely revolving cutter shafts adjustable toward and from each other carrying coöperating cutter heads, a gear mounted on the shaft of each cutter head, and an arm pivotally positioned on a fixed part of the machine and carrying two gears intermeshing with each other and with said first mentioned cutter shaft gears.

32. In a machine of the character described having a base and a reciprocating carriage mounted thereon, the combination of a pair of oppositely revolving cutter heads carrying knives for engaging work, said knives being mounted to swing about a point in the knife-edge as a center, and means comprising a stop for limiting the extreme angular movement of said knives.

33. In a machine of the character described, a base, standards rising from the base and carrying a revolving shaft, pattern controlled knives mounted in a head on the shaft, and a pattern supported against the thrust of said knives by one of said standards.

34. In a machine of the character described, a framework rising from the base and carrying a revolving shaft, a pattern controlled cutting element on said shaft, and a pattern supported against the thrust of said element by said frame.

35. In a machine of the character described, a reciprocating, work-carrying carriage, a main cutter for operating upon the work, a stock in which the work is held and which approaches the main cutter during the working operation, an auxiliary cutter for operating upon the work during the advance of the work to the main cutter, and automatic means for moving the auxiliary cutter out of the path of the stock upon the completion of its operation.

36. In a machine of the character described, a reciprocating, work-carrying carriage, a stock in which the work is held, a main cutter for operating upon the work, an auxiliary cutter for operating upon the work in advance of the main cutter, means for moving the auxiliary cutter out of the path of the stock upon the completion of its operation, and means for returning said auxiliary cutter to its original position upon the return movement of the carriage.

37. In a machine for forming the blades of oars, main cutters for operating upon the work provided with controllable knives, means for shaping the edge of the work to the proper contour, means for so moving the work between the knives on the main cutters as to form an edge of uniform thickness, and means for controlling the said knives to form the back-bone of the blade.

38. In a machine of the character described, a reciprocable work-carrying carriage, a revoluble cutter head, a knife mounted on said cutter head for motion about a point in the knife edge as a center and means for moving said knife.

In testimony whereof I have signed my name to this specification in the presence of two subscribing witnesses.

JOHN P. TARBOX.

Witnesses:
PEARL THWAITE,
E. EDMONSTON, Jr.